United States Patent [19]

Muhle et al.

[11] Patent Number: 4,510,271

[45] Date of Patent: Apr. 9, 1985

[54] METHOD OF FINISHING THERMOPLASTIC GRANULES

[75] Inventors: Mike E. Muhle, Kingwood; Richard J. Stolz, LaPorte; Cecil W. Wright, Baytown, all of Tex.

[73] Assignee: Exxon Research & Engineering Co., Florham Park, N.J.

[21] Appl. No.: 437,055

[22] Filed: Oct. 27, 1982

[51] Int. Cl.³ .................................. C08J 3/20
[52] U.S. Cl. .................................. 523/346; 523/351
[58] Field of Search .................... 523/346, 351

[56] References Cited

U.S. PATENT DOCUMENTS

| | | | |
|---|---|---|---|
| 2,540,146 | 2/1951 | Stober | 523/351 |
| 3,275,591 | 9/1966 | Tomlinson | 523/351 |
| 3,413,249 | 11/1968 | Luftglass et al. | 523/351 |
| 3,496,133 | 2/1970 | Hoffman | 523/351 |
| 3,932,323 | 1/1976 | Perry | 523/351 |
| 4,116,908 | 9/1978 | Emery | 523/351 |

Primary Examiner—Joseph L. Schofer
Assistant Examiner—N. Sarofin
Attorney, Agent, or Firm—R. L. Graham

[57] ABSTRACT

Thermoplastic granules are finished by blending thermoplastic granules with additive material to form a masterblend; intensively mixing the masterblend with additional thermoplastic granules under conditions (1) to increase the temperature of the thermoplastic to its softening temperature and (2) to increase the bulk density of the granules; and withdrawing and cooling the mixture to form free flowing granules containing additives thereon or therein.

16 Claims, 1 Drawing Figure

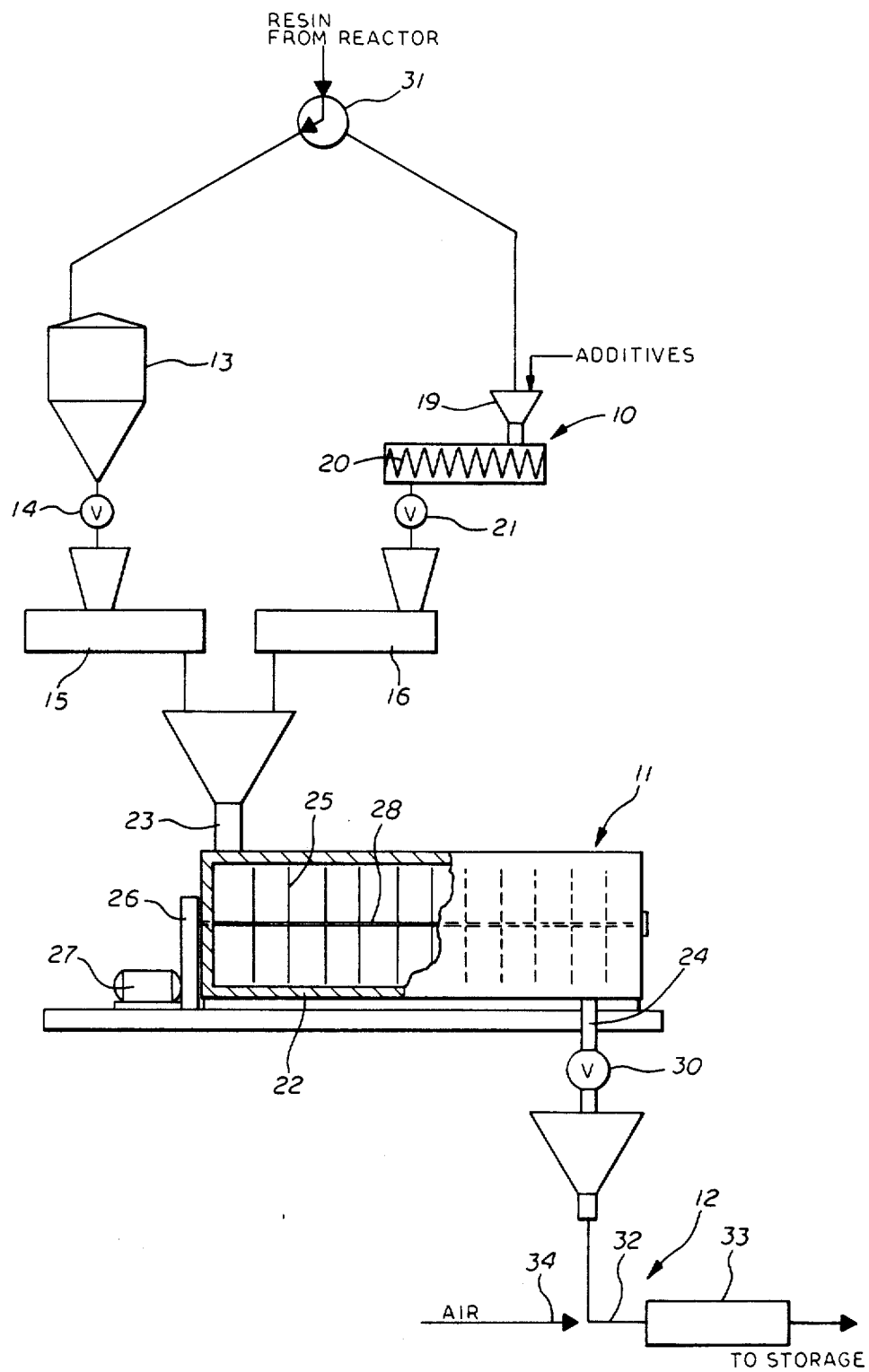

METHOD OF FINISHING THERMOPLASTIC GRANULES

BACKGROUND OF THE INVENTION

The invention relates to the finishing of granular polymer resins. In one aspect, the invention relates to a process for production of finished granular resins of desired bulky density and having additives incorporated therein and improving flowability.

The recent development of certain linear low density polyethylenes (LLDPE) has resulted in a new product which presents certain superior properties over conventional branched low density polyethylene (LDPE). These new resins are manufactured by low pressure processes which produce the resin as granular product large enough and dense enough that conventional pelletizing is unnecessary. This not only saves cost but also avoids any resin degradation which might result from the pellet forming operation during the manufacturing process of the resin.

Since the polyethylene granules do not need to be pelletized, conventional polyethylene compounding and finishing operations are not suited for this product. For example, in pelletizing conventional LDPE, additives (e.g. antioxidants, antiblock and slip, etc.) are conveniently incorporated by melt blending in the mixer and/or extruder used to form the pellets. (The term "finishing" as used herein refers to a process for converting virgin resin to useable form. Additives are incorporated to impart the desired end-use properties to the product and particle shaping and size classification place the product in a form suitable for the fabricators.)

Other polymer finishing techniques, of course, have been suggested by the prior art, but these are not totally satisfactory because of the restrictive requirements for finished polyethylene.

An important requirement of the finishing technique is to disperse the additives throughout the granular product. For best results, the additives should coat or contact substantially all of the granules.

Another important function of the finishing technique is to increase the bulk density of the granular material in order to reduce storage and transportation volumes, as well as maximize extrusion equipment throughput rates. This requires improvement of the overall shape factor by reduction of the average particle size of the granules, while avoiding generation of excessive fines. Finally, the product with additive should be free-flowing discrete particles to permit handling and transporting with conventional equipment.

In providing the desired properties and particle size to the product, the finishing system should be capable of processing the granules at full production rates. For all practical purposes, this means the process should be continuous, as opposed to batch. At commercial rates, batch processes are generally unsatisfactory because parallel alternating systems, and batch cooling are required.

Simply blending or tumbling the ingredients together at ambient conditions is not satisfactory for several reasons. Uniform additive dispersion is not only difficult to obtain, but the "salt-and-pepper" mixture is not as effective as additives actually contacting the individual granules. Moreover, the particulate additives such as antiblock (silica) are extremely fine and would not adhere to the granules except possibly by transient electrostatic attraction. These particles would become segregated during handling and storage which not only would reduce the effectiveness of the additive but in the case of silica antiblock could present health hazards due to the free silica, particularly cristobalite. Another serious deficiency of simple blending operations is that the energy imparted to the granules is insufficient to have a significant effect on particle shape factor.

It has also been proposed to prepare pelletized masterbatch with additives, followed by grinding and blending with the virgin resin. A problem associated with this approach is one of economics; the cost of the preparation of the masterbatch itself is relatively high because of the energy required to melt, pelletize and grind the resin forming the masterbatch. Perhaps a more serious problem inherent in the masterbatch technique is that only the particles of masterbatch contain additive. Tests have shown that best results are obtained with additives in contact with all the granules. The resin granules with which the masterbatch is blended do not contain additives. The finished product, including resin granules and masterbatch particles, may not have uniform properties.

Intensive mixers have been proposed for treating resinous particulate materials. These intensive mixers employ rotating blades to impart high energy to the system, causing the mixing to take place at elevated temperatures. Representative uses of intensive mixers in treating particulate resins are discussed below.

U.S. Pat. No. 3,229,002 discloses the use of an intensive mixer for "polishing" thermoplastic pulverized resin (e.g. polyolefins, nylon, etc.) to improve its flowability and bulk density. The purpose of the treament is to improve flowability and density for molding, coating, and rug backing applications.

U.S. Pat. No. 3,632,369 discloses the use of high intensive mixer for admixing pigment with ground resins. The pigment addition is achieved by operating the intensive mixer at conditions to produce abrasive adherence of the pigment to the polymer particle.

U.S. Pat. No. 3,736,173 discloses the use of a high speed mixer to incorporate a curing agent into polyolefin pelletized granules by penetration and diffusion.

U.S. Pat. No. 3,997,494 discloses the use of high speed intensive mixer for incorporating filler material into polymer pellets, then removing the blended materials from the pellets until the filler material is used up.

U.S. Pat. No. 4,230,615 discloses the use of a high speed high intensity mixer to fully flux thermoplastic resins.

As will be apparent from the following description, the method of the present invention involves principles of operation different than the techniques noted above, and accordingly, represents an improvement thereover for treating granular resins. The invention permits the finishing granules of thermoplastic resins without fluxing or grinding the resin.

BRIEF DESCRIPTION OF THE DRAWING

The Drawing is a flow diagram schematically illustrating a system for carrying out the process of the present invention.

SUMMARY OF THE INVENTION

In its broadest aspect, the present invention relates to a method for continuously incorporating additives into granular thermoplastic resin which comprises three main steps:

(a) blending the thermoplastic granules with additive material at a ratio wherein the additive material comprises from 0.001 to 40 wt% of the blend (preferably 0.1 to 20 wt%) and at a temperature less than the softening point of the thermoplastic to form a masterblend;

(b) mixing the masterblend and additional thermoplastic granules in an intensive mixer in a granular/masterblend weight ratio of between about 5:1 to 50:1 (preferably 10:1 to 40:1) to provide additive concentration of between above 0.01 weight percent to 5 weight percent (preferably 0.05 to 2 wt%) based on the combined weight of the granules and additives and under conditions (i) to increase the temperature of the thermoplastic granules to its softening temperature, and (ii) increase that bulk density of the granules by at least 5% (preferably at least 10%) without forming substantial amounts of fines; and (c) withdrawing the mixture from the intensive mixer and causing the mixture to cool forming free-flowing granules containing additives thereon.

As used herein, the term "granules" means resin particles in the form and size as discharged from the reactor. (In polymerization operations which produce granules, the particle size of the bulk of the granules fall between about 5 and 200 mesh). Granules are to be distinguished from (a) pellets which have been melt processed into uniformly sized and shaped particles of generally regular shape and (b) from "powder" or "fines" which have a particle size smaller than 200 mesh. (All "mesh sizes" are expressed in terms of U.S. Sieve Series.)

The term "softening point" means the temperature range at which the thermoplastic resin, or at least its outer surface, becomes tacky.

Additives for resins are available in particulate form (normally smaller in particle size than the resin granules, with ranges in particle size between about 1 micron to about 1000 microns) or in liquid form. Certain fusible additives (herein referred to as "liquifiable" additives) are available in solid form. These additives melt and coat the graules under finishing conditions.

The initial step of forming the masterblend may be carried out in a blender such as a ribbon blender operated at a temperature below the resin softening temperature. This produces a blend in which the substantial amounts of finely divided additives or liquid additives coat the resin granules. These resin granules thus act, at least in part, as the carrier for the additive particles which in the intensive mixer are transferred to other resin granules. The masterblend thus provides an initial dispersement of the additives on the thermoplastic resin granules and facilitates the more thorough additive dispersement in the intensive mixer. The concentration of the additives in the masterblend is selected to provide the desired concentration in the total volume of resin treated.

The second step of the process is provided by an intensive mixer which may include a horizontal drum having rotating arms mounted therein. Resin granules and masterblend granules are continuously fed into the drum and are intermixed by the action of the rotating arms. This action generates heat by the impingement of the particles and granules on each and by contact with the blades and wall. The intensive mixing thus achieves these desirable results:

1. The granules are slightly rounded as a result of the rough edges being smoothed, increasing the bulk density of the product and improving granule shape factor and resultant flowability, and 2. The softening temperature of the outer surface of the resin is reached causing the additive particles to imbed or stick thereto and the liquid to diffuse therein. Maintenance of the resin softening temperature also aids in increasing the bulk density of the granules. It should be observed that the collision of the masterblend granules with the virgin resin granules results in the transfer of additive. It has been observed that there is no difference between the masterblend granules and the virgin granules in the amount of additives thereon, and 3. Agglomerates of granules are broken apart into smaller agglomerates or undivided particles.

The critical parameters in the intensive mixing step include residence time and temperature of the resin. Conditions must be such to provide sufficient residence time to cause at lease a slight rounding of the particles as well as sufficient tumbling to result in uniformly mixing the masterblend with the virgin resin granules. Tests indicate that tip speeds of the intensive mixer arms in the range of about 35 to about 80 feet per second provide best results. Tip speeds below this level do not generate sufficient kinetic energy to attain resin softening temperature and tip speeds above 80 ft/sec. results in excessive energy input which is not only costly but could cause granule agglomeration or excessive fines generation.

In the cooling step, the granules are continuously withdrawn from the intensive mixer and pneumatically conveyed through a cooling sytem to separate and solidify the discrete granules thereby resulting in a free-flowing product.

In a preferred embodiment of the invention, the resin granules are linear low density polyethylene produced by gas phase process. The resin has a mesh size between 5 and 200 and are porous which aids in additive addition (i.e. particles become entrapped in the interstices). The particle additives include antioxidant particles, antiblock particles, processing aids, pigments, UV stabilizers, etc,. Liquid or liquifiable additives include processing stabilizers, slip, antioxidant, etc. It will be appreciated by those skilled in the art however that other resins produced in granular form may be employed. These include polypropylene, high density polyethylene, PVC, and copolymers of these. In addition the granular resins may include other polymers (granule or ground) blended therewith. Examples of other polymers include low density polyethylene, ethyl/vinyl acetate copolymers, high density polyethylene, polypropylene, and the like.

DESCRIPTION OF THE PREFERRED EMBODIMENTS

As mentioned previously, the method of the present invention is particularly suited for incorporating additives into linear low density polyethylene (LLDPE) produced by low pressure process, gas phase or liquid slurry. LLDPE is made by polymerizing in the presence of a suitable catalyst ethylene with an α-olefin comonomer that contributes the side chain and hence lowers density. Comonomer, either singly or in combination, such as propylene, butene-1, hexene-1, octene-1 and 4-methylpentene-1 and pentene-1 is used. Granular LLDPE may be made by gas phase fluidized bed, or gas phase stirred bed. Although this product can be sold directly, it is customarily treated with additives to impart the desired properties to the polymer.

The additives which are added to polyolefin resin granules typically include the following:

| Additive | Example | Form | Concentration |
|---|---|---|---|
| Antiblock | Silica | particulate | 1–10,000 PPM |
| Slip | Long chain fatty Acid | liquifiable pellets | 100–1500 PPM |
| Antioxidant | Hindered Phenol | particulate or liquid | 10–10,000 PPM |
| Chloride Scavengers | metal stearate | particulate | 10–3,000 PPM |
| Coloring agents | pigments | liquids or particulate | 10–10,000 PPM |

The low pressure gas phase processes produce a granular polyethylene having a particle size between about 5 and 200 mesh (average particle size between 0.003 and 0.2 inches) and a bulk density of between about 20 to 30 pounds per cubic foot. From an economic and marketing standpoint it is desirable to increase the bulk density and to provide the additives as indicated above. In accordance with the present invention, these two important steps are performed in the same finishing operation.

As illustrated in the Drawing, the facilities for carrying out the present invention includes three main components: blender 10, intensive mixer 11, and cooling line 12. In addition, the facilities preferably will include means for continuously feeding the virgin resin and masterblend into the mixer 11 in the desired weight proportion. Such granular apportioning means illustrated in the Drawing include bin 13 equipped with slide valve 14, and feed auger 15 for handling virgin resin; and feed auger 16 for handling masterblend.

Blender 10 serves to prepare the masterblend at temperatures below the softening point of the resin. A variety of low speed blenders are suitable for this purpose. Schematically illustrated in the Drawing is a ribbon blender having chute 19 for receiving virgin resin and additives, rotating helix 20, and outlet valve 21. A horizontal ribbon blender, manufactured by Young Industries, Inc. is an example of a blender useable in the present invention.

A variety of high intensive mixer may be used but the horizontal continuous type with rotating blade is preferred because it permits resin finishing to be carried out at the same rate as resin production from the reactor. For purposes of illustration, the invention will be described with reference to an intensive mixer of the type manufactured by Wedco International, Inc adapted to handle LLDPE produced by the low pressure gas phase, fluidized bed process.

The intensive mixer 11 includes a drum 22 having inlet 23 and outlet 24; rotating members 25, gear box 26 and drive motor 27. The rotating member 25 in the form of radial arms or paddles, are mounted on shaft 28 which extends through drum 22 terminating in gear box 26. The selection of the motor 27 and gear ratio in gear box 26 provide the desired rpm of the mixing members 25 within drum 22.

In order to prevent discoloration of the resin, it is preferred that the mixing chamber of the mixer 11 be coated with an abrasive resistant material such as chrome or a ceramic, preferably aluminum oxide. Tests have shown that processing granules with antiblock (Silica) in mixing chambers of stainless steel or carbon steel, the granules take on a gray color. It has been discovered that the discoloration occurs as a result of the abrasive particles (e.g. Silica) removing minute amounts of metal and/or deposits from the chamber surface. Tests have also shown that when the mixing chamber surface is made of an abrasive resistant material, the granule discoloration is substantially eliminated. The ceramic (e.g. aluminum oxide) can be applied to the interior of the mixer by known spray coating techniques.

The drum discharge 24 is provided with slide valve 30 for controlling resin discharge therefrom. The slide valve 30 may be operatively connected to a device (not shown) for sensing resin temperature within drum 22 such that a controlled resin temperature is maintained in the drum mixing chamber. This temperature should be sufficiently high to cause at least the outer surface of the resin particles to soften but not so high as to cause melt fluxing. The controlled temperature of course will depend upon the material used. For LLDPE, temperature in the range of 175° to 230° F. is satisfactory for most operations.

The drum 22 may also be provided with a water cooling jacket and nitrogen purge system (not shown).

The particles upon leaving the mixer 11 pass through an agitation and cooling stage. This stage of the operation may be provided by line 32 having a heat exchanger 33. Air introduced at 34 agitates and conveys the granules through a cooling system such as a heat exchanger to storage. A cyclone (not shown) may be provided in the discharge line to separate resin and air.

In operation, resin granules are delivered to the finishing facilities in essentially the same form and shape as discharged from the reactor. In the case of LLDPE, the granules are irregularly shaped, generally rounded agglomerations of smaller particles which exhibit significant porosity.

By means of a diverter valve 31, the granules may be flowed (by gravity or pneumatically conveyed) to either bin 13 or chute 19. In practice, valve 31 will be programmed such that most of the flow will be directed to bin 13, and only a minor amount to chute 19.

The granules in bin 13 gravitate into the inlet chute of auger 15. The level of the granules in bin 13 will be controlled by slide valve 14 to provide positive feed.

The granules diverted to chute 19 are admixed with additives introduced through chute 19 and agitated therein until the additives and resin are thoroughly mixed to form the masterblend. Valve 21 is then opened feeding masterblend to feed auger 16. The additives may be introduced in particulate or liquid form. The smaller particulate additives tend to lightly adhere to larger resin granules due to electrostatic charges, and the liquid additives lightly coat the resin granules. Liquifiable particulate additives disperse in the granules.

Feed augers 15 and 16 are rotated in timed relationship to continuously feed virgin resin and masterblend to the mixer chute in the desired weight ratio. Rotation of members 25 mixes the masterblend and virgin resin as the mass flows horizontally through the drum from the inlet 23 to the outlet 24. The granule collisions with each other and with the rotating members (1) creates friction which generates heat (2) rounds the granules, and (3) transfers some of the additives from the masterblend granules to the virgin resin granules (4) break apart agglomerates.

The incorporation of additives into or onto the resin granules is accomplished in an intensive mixer 11 following two different mechanisms. If the additive in question is liquid or has a melting point below that at which the mixer 11 is operating, the material will coat along the surface of both the masterblend granule and the virgin resin granule. Upon cooling, the additive will encapsulate the granule. Highly volatile additives may diffuse into the granule under these same conditions. The second mechanism involves those additives which do not melt at the polymer softening point. In this case, the granule surface softens and the mixing action imparts enough kinetic energy into the additive and granule that the collisions result in the additive being impinged into the granule. The irregular surface and porosity of the granules aids in the coating action by entrapping additives particles. When the granule cools, the additives are adhered to the surface. The presence of lower melting point additives may improve the adherence of higher melting additives as they may act as a bonding agent.

In both mechanisms described above, the collision of the granules plays a significant role in additive transfer and dispersion.

The increase in granular bulk density also follows two separate mechanisms. Bulk density in a material such as granular LLDPE is dependent on two factors:
 o Particle size distribution
 o Particle shape Particles exiting from the LLDPE fluid bed reactor contain agglomerates of smaller particles and very irregularly shaped particles. By subjecting the particles to an intensive mixer, both the particle size distribution and the particle shape are improved. The mixing action breaks up to the large agglomerates resulting in a downward shift in the particle size distribution. (The average particle size is reduced by at least 20%). The heating of the granule surface aids in the particle shape due to the mixing action and subsequent polishing. The sharp edges are smoothed out, and other irregular shapes may be brought to resemble more rounded or spherical granules. The combination of breaking down large agglomerates and rounding the particles results in better packing and thus increased bulk densities.

The following examples demonstrate the effectiveness of the present invention in increasing bulk density and providing for well dispersed additives in the resin.

EXAMPLES

Facilities

Tests were conducted using an intensive mixer manufactured by Wedco, Model BP-2030. The mixer included the following:
 Drum size—diameter—20 inches length—30 inches
 Motor—25 HP
 Tip Speed of rotating arms—61.6 ft/sec., 40.0 ft/sec.

Test Procedure

Each prepared masterblend was mixed with LLDPE (preheated to 130°-140° F. to simulate reactor discharge temperature) and introduced into the mixer along with virgin resin in a 1:10 blend ratio (by weight). The discharge valve of the Wedco was controlled to maintain a controlled temperature at the resin discharge. The resin residence time in the Wedco ranged between 30 seconds and 3 minutes. The resin was cooled by pneumatically conveying the Wedco discharge to storage. The resin used was LLDPE having the following properties:
 Melt Index dg/min.—2
 Density g/cc—0.918
 Average particle size—0.0664 in
 Bulk density—24.21 lb/ft$^3$
 Softening point—80° C.-110° C. (175°-230° F.)

The masterblend compositions are shown in Table 1 where the additives used were as follows:

| | Additive | Composition | Manufacturer's Trade Designation |
|---|---|---|---|
| 1. | Antiblock | diatomacious earth | Dicalite (Grefco) |
| 2. | Slip (co-efficient of friction reducer | fatty amide (melting point 148° F., 85° C.) | Erucamide (Humko Sheffield Chem. Co.) |
| 3. | U.V. Stabilizer | Particulate Organic Stabilizer | Tinuvin 622 (Ciba Geigy) |
| 4. | Antioxidant A | Phosphite (liquid) | Weston 399 (Ciba Geigy) |
| 5. | Antioxidant B | Organic stabilizer Melt Temp 112°-131° F., 50-55° C.) | Irganox 1076 (Ciba Geigy) |
| 6. | Antioxidant C | Particulate Organic stabilizer | Irgafos 168 (Ciba Geigy) |

In each of the tests runs 1-10, 12, and 13, two hundred pounds of the material was processed through the Wedco, and in test No. 11, fifteen hundred pounds of the material was processed through the Wedco mixer. In test runs Nos. 1, 2, and 5, the resin used was a blend of LLDPE granules and ground LDPE manufactured by Exxon Chemical Co. (trade designation LD100). The remaining tests used granular LLDPE.

Samples from each test run were obtained and analyzed for particle size distribution, bulk density, and flowability. The weighted average particle size was determined based on particle size distribution.

Test Results

The test results are shown in Table 2. The significance of these data are discussed below:
 a. The bulk density was increased by a minimum of about 10%.
 b. The average particle size of the granules leaving the mixer was from about 50% to 70% of the average particle size of the resin granules entering the mixer.
 c. The fines were not substantially increased, indicating the particle size distribution was substantially reduced.
 d. The flowability of the finished granules was improved.

The morphology of certain samples was analyzed by the following techniques:
 (a) the surface morphology was studied by scanning electron microscopy
 (b) granules were embedded in epoxy, microtomed and examined by optical microscopy to reveal internal porosity
 (c) The Si concentration in the microtomed section was mapped using energy dispersion x-ray microanalysis.

These analysis revealed that the resin granules have large surface areas and porosity which can have a significant role in the adhesion and retention of additives. The silica antiblock was observed to be embedded in the granule surface and well distributed among the granules. Also silica particles were observed to be trapped in interstices within the granules.

In summary, the above tests demonstrate that granular resin can be processed by the present invention to:
(a) uniformly incorporate additives into the granular product
(b) increase the bulk density by at least 10%
(c) reduce the average particle size without generation of excessive fines
(d) produce a free-flowing product.

The above examples demonstrate the effectiveness of the method in connection with processing LLDPE. However, it will be appreciated by those skilled in the art that the method may be used also in processing other granular polymers and copolymers such as polypropylene, High Density Polyethylene, Low Density Polyethylene, and blends of these polymers. The present invention is particularly suited for treating Polypropylene and certain forms of High Density Polyethylene since these are prepared in granular form.

TABLE 1

| Additive Package | Additive Package Contents* | | | | | | | |
|---|---|---|---|---|---|---|---|---|
| | LLDPE | Antiblock | Slip | Ground LDPE | U.V. Stabilizer | Antioxidant A | Antioxidant B | Antioxidant C |
| A | 48.5 | — | 1.5 | 50.0 | — | — | — | — |
| B | 42.0 | 8.0 | — | 50.0 | — | — | — | — |
| C | 98.5 | — | 1.5 | — | — | — | — | — |
| D | 89.5 | 8.0 | 1.5 | — | — | 1.0 | — | — |
| E | 49.0 | — | — | 50.0 | — | 1.0 | — | — |
| F | 90.5 | 8.0 | 1.5 | — | — | — | — | — |
| G | 98.0 | — | — | — | 2.0 | — | — | — |
| H | 92.0 | 8.0 | — | — | — | — | — | — |
| I | 99.0 | — | — | — | — | — | — | 1.0 |
| J | 99.0 | — | — | — | — | — | 1.0 | — |
| K | 99.0 | — | — | — | — | — | 0.5 | 0.5 |
| L | 99.5 | — | — | — | — | — | — | 0.5 |

*All numbers denote wt. %

TABLE 2

| Test No. | Additive Package | Inlet Temp. (°F.) | Outlet Temp. (°F.) | Rate (lb/hr) | Tip Speed (ft/sec) | Fines (0.3 wt. %)* | Bulk Density (24.21 lb/ft³)* | Flowability (30.25 sec/100 g)* | Avg. Particle Size (.0664 in)* |
|---|---|---|---|---|---|---|---|---|---|
| 1 | A | 140 | 175 | 580 | 61.6 | 0.2 | 27.6 | 18.72 | .0466 |
| 2 | B | 133 | 210 | 600 | 61.6 | 0.6 | 27.1 | 20.10 | .0375 |
| 3 | C | 140 | 210 | 570 | 61.6 | 0.1 | 29.3 | 15.78 | .0347 |
| 4 | D | 131 | 175 | 580 | 61.6 | 0.1 | 27.0 | 20.81 | .0439 |
| 5 | E | 126 | 175 | 540 | 61.6 | 0.0 | 26.5 | 22.99 | .0470 |
| 6 | F | 136 | 210 | 570 | 40.0 | 0.5 | 29.0 | 16.57 | .0391 |
| 7 | G | 131 | 175 | 570 | 40.0 | 0.0 | 27.0 | 22.55 | .0426 |
| 8 | G | 140 | 210 | 590 | 40.0 | 0.0 | 27.8 | 20.10 | .0392 |
| 9 | I | 131 | 210 | 580 | 40.0 | 0.3 | 29.1 | 16.52 | .0345 |
| 10 | J | 131 | 210 | 600 | 40.0 | 0.2 | 28.6 | 18.78 | .0385 |
| 11 | H | 131 | 210 | 590 | 40.0 | 0.3 | 28.3 | 17.18 | .0388 |
| 12 | K | 131 | 210 | 600 | 40.0 | 0.2 | 28.4 | 18.90 | .0360 |
| 13 | L | 131 | 210 | 600 | 40.0 | 0.1 | 28.8 | 17.40 | .0357 |

*Note 1 - numbers in paranthesis indicate base resin data

What is claimed is:

1. A method of finishing polyolefin thermoplastic granules which comprises:
  (a) blending the thermoplastic granules with additive material at a ratio wherein the additive material comprises from about 0.001 to 40 weight percent of the blend, and at a temperature below the softening point of the thermoplastic to form a masterblend;
  (b) continuously introducing the masterblend and additional polyolefin thermoplastic resin into an intensive mixer in a resin/masterblend weight ratio of between about 5:1 to 50:1, and mixing the masterblend and additional thermoplastic granules therein under conditions (i) to increase the temperature of the thermoplastic to its softening point but below its fluxing temperature whereby additive material is embedded into or onto substantially all the granules and (ii) to increase the bulk density of the blend by at least 5 percent without producing excessive fines; and
  (c) continuously withdrawing and cooling the mixture from the intensive mixer to from free-flowing discrete particles.

2. The method as defined in claim 2 wherein the blending rates and mixing ratio are such to provide the mixture with an additive material concentration of between about 0.01 and 5 weight percent based on the mixture.

3. The method as defined in claim 1 wherein the thermoplastic granules and additive material are blended to provide additive material concentration in the master blend of between 0.1 to 20 weight percent.

4. The method as defined in claim 1 wherein the master blend and additional thermoplastic resin are mixed in the intensive mixture in a resin/masterblend weight ratio of between 10:1 and 40:1, respectively.

5. The method as defined in claim 2 wherein the blending ratio and mixing ratio are such to provide the mixture with an additive material concentration of between 0.05 and 2 weight percent.

6. The method as defined in claim 1 wherein the additive material includes finely divided particles which, in part, adhere to the granules in the masterblend, and wherein part of the particles are transferred from masterblend particles to virgin resin particles in the intensive mixing and become substantially permanently adhered to said granules upon cooling.

7. The method as defined in claim 1 wherein the polyolefin thermoplastic granules are ethylene or propylene polymeric granules produced by gas phase or liquid slurry processes and wherein the intensive mixing step increases the bulk density to at least 26 pounds per cubic foot.

8. The method as defined in claim 7 wherein the polyolefin granules are a linear low density polyethylene having a mesh size of between about 5 and 200, a porosity of at least 1%, and a bulk density in excess of 22 pounds per cubic foot, and wherein the intensive mixing increases the polyethylene temperature to a level between 175° and 240° F.

9. The method as defined in claim 8 wherein the intensive mixing is achieved in a horizontal mixing chamber provided with arms which rotate about a horizontal axis at a tip speed of between about 35 and 80 feet/sec.

10. The method as defined in claim 9 wherein the mixing chamber is coated with an abrasive resistant material.

11. The method as defined in claim 10 wherein the abrasive resistent material is a ceramic.

12. The method as defined in claim 8 wherein the additive material is liquid.

13. The method as defined in claim 8 wherein the additive material is particulate at the blending temperature and liquid at the softening temperature of the thermoplastic.

14. The method as defined in claim 8 wherein the particle size reduction in the intensive mixing is sufficient to provide at least a 10% increase in bulk density.

15. The method as defined in claim 8 wherein the additives include finely divided particles, liquid and liquifiable particles.

16. A method of treating ethylene homopolymers or copolymers produced by gas phase, fluid bed process in the form of granules having an average particle size between about 0.03 and 0.1 inches, said method comprising
  (a) blending the granules and additive material at a ratio wherein the additive material comprises from about 0.5 to 20 wt% of the blend, and at a temperature below the softening point of the polymer to form a masterblend comprising polymer granules at least partially coated with additive material;
  (b) intensively mixing the masterblend with additional untreated polymer granules in a granules/masterblend weight ratio of between about 10:1 and 40:1, and at conditions (i) to increase the temperature of the polymer to its softening point, and (ii) to reduce the average particle size of the granules by at least 20% without producing excessive fines; whereby part of the additive material is transferred from the masterblend granule to the untreated granules, and
  (c) cooling the granules whereby the additive material becomes substantially permanently adhered to the granules.

* * * * *